Dec. 1, 1931.  F. SMELIK ET AL  1,834,501
SPLIT BEARING
Filed Jan. 18, 1930  2 Sheets-Sheet 2
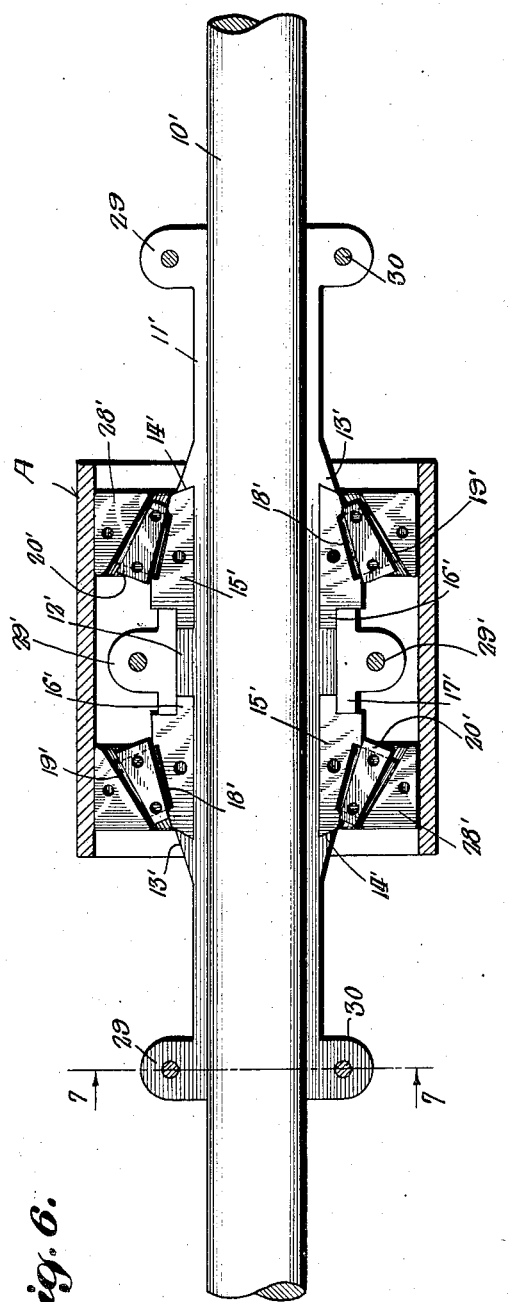
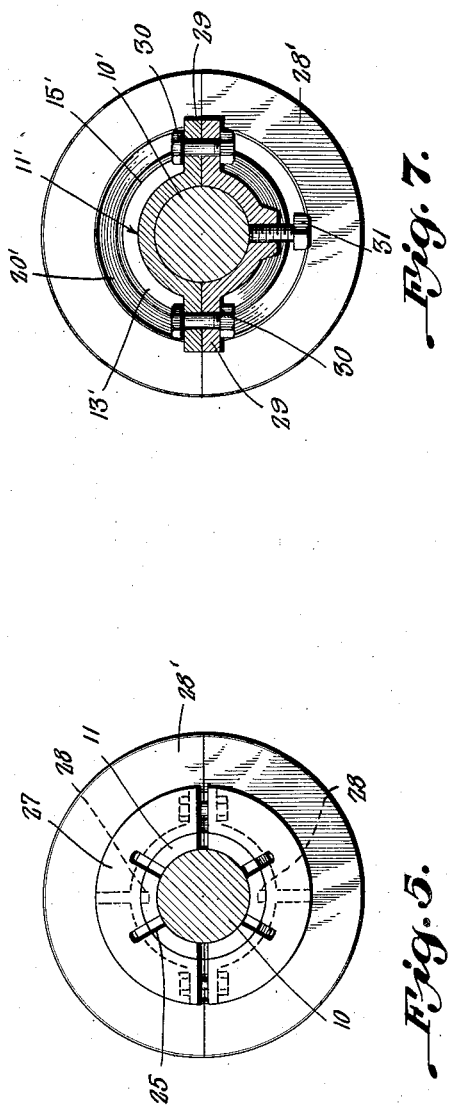
Inventor
F. Smelik and L. J. Krudwig
By Horace C. Chandler
Attorney Patented Dec. 1, 1931

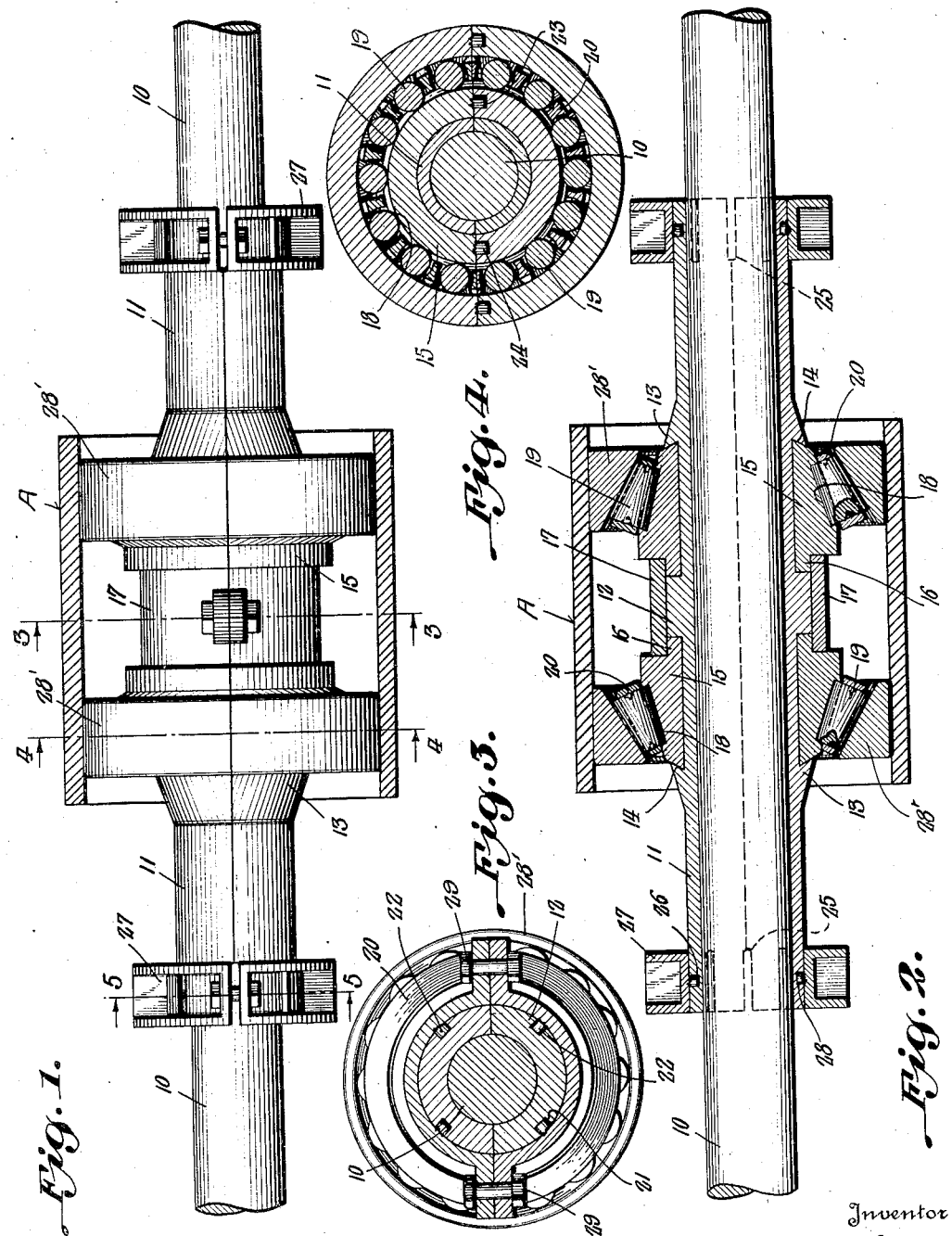

1,834,501

UNITED STATES PATENT OFFICE

FRANK SMELIK AND LOUIS J. KRUDWIG, OF ST. LOUIS, MISSOURI

SPLIT BEARING

Application filed January 18, 1930. Serial No. 421,840.

This invention relates to new and useful improvements in bearings for shafts, and particularly to roller bearings.

The principal object of the invention is to provide bearings of this character which can be easily and quickly applied to a shaft, and removed therefrom, without the necessity of removing the shaft.

Other objects and advantages will be apparent from the following description when taken in connection with the accompanying drawings.

In the drawings:

Figure 1 is an elevation of a roller bearing assembly, showing one form of the invention.

Figure 2 is a vertical longitudinal central sectional view through the assembly shown in Figure 1.

Figure 3 is a vertical sectional view on the line 3—3 of Figure 1.

Figure 4 is a vertical sectional view on the line 4—4 of Figure 1.

Figure 5 is a vertical sectional view on the line 5—5 of Figure 1.

Figure 6 is a vertical longitudinal central sectional view, similar to Figure 1, but showing another form of the sleeve of the bearing, and the manner of connecting the same to the shaft.

Figure 7 is a vertical sectional view on the line 7—7 of Figure 6.

Referring to the accompanying drawings, and particularly to Figures 1 to 5, inclusive, 10 represents a shaft, in connection with which the present invention is especially adapted for use. Enclosing the shaft is a longitudinally split sleeve 11, such sleeve being in two parts which readily permit removal thereof from the shaft without removing the shaft from its position. The intermediate portion of the sleeve 11 is formed with a peripheral rib 12, and on each side of said rib is a peripheral rib 13. The face of each rib 13, adjacent the rib 12, is undercut, as shown at 14, to receive the beveled end face of a split ring 15, which encircles the sleeve, within the space between the rib 13 and the rib 12. The inner end of the ring 15 is formed with a rib 16 which abuts the adjacent side face of the rib 12, said rib having its outer peripheral face lying in the plane of the peripheral face of the rib 12. A retaining ring 17, which is also split, is engaged around the periphery of the rib 12, and is of a width to overlie the ribs 16, of the ring 15, to retain said rings in position, as will be readily apparent from an inspection of the drawings. The outer peripheral face of each of the rings 15 is inclined downwardly and outwardly, toward the end of the sleeve, and is formed with a peripheral groove 18, in which the rollers 19 are arranged to run. These rollers are slightly tapered, longitudinally, and are mounted in the bearing retaining ring 20. In the peripheral face of the rib 12 there are formed the sockets 21, in which are received the lugs 22, carried by the ring 17. The abutting ends of the sections of the rings 15 are respectively provided with the pins and sockets, to hold the sections against lateral play, as will be readily understood, and as shown at 23 and 24, in the drawings.

Each end of the sleeve is formed with a plurality of longitudinally extending slots, or kerfs 25, and at certain points, between said kerfs, there are formed the openings 26. Engaged on each of the kerfed ends of the said sleeve is a separable clamping collar 27, which, when tightly clamped in position, will compress the ends of the sleeve into firm frictional engagement with the shaft, so that the sleeve and shaft will rotate as a unit, within the rings of roller bearings. Each of the collars 27 has the inwardly projecting lugs 28, which engage in the before-mentioned openings 26, to prevent disengagement of the collar from the sleeve.

The sections of the retaining ring 17 are detachably secured together by means of the bolts 29, so that when it is desired to remove the bearings from the shaft, the operator simply removes the bolts 29, and the ring 17, whereupon the removal of the bearing ring sections and the rings 15 is readily accomplished. Separation of the parts of the collars 27, and removal thereof from the ends of the sleeve, then permit removal of the sleeve sections from the shaft, without disturbing said shaft.

Surrounding the sleeve, and properly housed within the casing A, are the cone rings 28', which form outer races against which the rollers bear. These rings are also split, to facilitate application and removal, without disturbing the shaft. All of the parts of the bearing are like those already described, and are similarly numbered, except that the numerals have prime marks.

The ends of the sleeve 11' are provided with the laterally extending apertured ears 29, which receive the clamping bolts 30, for holding the sleeve on the shaft. In one side of the end of each sleeve section there is engaged a screw 31, which, when the sleeve is properly engaged around the shaft, are turned up tightly against the shaft, whereby to hold the sleeve and shaft together.

What is claimed is:

A roller bearing device including a sleeve for embracing a shaft and having an intermediate peripheral rib and underbeveled ribs on opposite sides thereof and spaced therefrom to form parallel circumferential grooves, a ring seated in each groove and having one side beveled to fit beneath the underbeveled rib, the other side of each ring being rabbeted, a retaining ring encircling the intermediate rib and bearing on said rabbets, the peripheral face of each of the first rings being beveled in the direction of the outer end thereof and formed with a circumferential groove, tapered rollers in said grooves, cone rings disposed outwardly of said rollers and bearing thereagainst, the sleeve, the rings, the retaining ring and cone being longitudinally split and clamped about said shaft.

In testimony whereof, we affix our signatures.

FRANK SMELIK.
LOUIS J. KRUDWIG.